(12) United States Patent
Teranishi et al.

(10) Patent No.: US 9,934,038 B2
(45) Date of Patent: Apr. 3, 2018

(54) CONDITIONALLY EXECUTING CONVERTED NON-ISA INSTRUCTIONS BASED ON GPU DISPLAY SETTINGS

(75) Inventors: Tsutomu Teranishi, Tokyo (JP); Tomohiro Oto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 889 days.

(21) Appl. No.: 13/525,489

(22) Filed: Jun. 18, 2012

(65) Prior Publication Data

US 2012/0331277 A1 Dec. 27, 2012

(30) Foreign Application Priority Data

Jun. 24, 2011 (JP) .................................. 2011-141186

(51) Int. Cl.
*G06F 9/30* (2018.01)
*G06F 9/455* (2018.01)

(52) U.S. Cl.
CPC ...... *G06F 9/30181* (2013.01); *G06F 9/30076* (2013.01); *G06F 9/30174* (2013.01); *G06F 9/45504* (2013.01)

(58) Field of Classification Search
CPC ............................ G06F 9/3017; G06F 9/30174
USPC ...................................................... 712/209
See application file for complete search history.

(56) References Cited

U.S. PATENT DOCUMENTS

| | | | |
|---|---|---|---|
| 5,758,140 A * | 5/1998 | Kahle et al. | 712/227 |
| 6,789,186 B1 * | 9/2004 | Brockmann et al. | 712/231 |
| 7,395,532 B2 * | 7/2008 | Borneo et al. | 717/161 |
| 2003/0236965 A1 * | 12/2003 | Sheaffer | 712/209 |
| 2008/0141012 A1 * | 6/2008 | Yehia et al. | 712/226 |
| 2011/0106867 A1 * | 5/2011 | Ramanujam | 708/204 |
| 2011/0141108 A1 * | 6/2011 | Masuda | G06F 3/0488 345/419 |
| 2012/0062554 A1 * | 3/2012 | Ueno | H04N 13/0048 345/419 |
| 2012/0249541 A1 * | 10/2012 | Sato | G06F 1/1694 345/419 |

* cited by examiner

*Primary Examiner* — Jacob A Petranek
(74) *Attorney, Agent, or Firm* — Matthew B. Dernier, Esq.

(57) ABSTRACT

An acquisition unit acquires a command that is executable by a processor of an other type being a processor of a different type from a processor of a processing execution subject apparatus. An identification unit identifies processing that is executable by the processor of the processing execution subject apparatus which is associated with the command acquired by the acquisition unit. An execution control unit controls execution of the processing performed by the processor of the processing execution subject apparatus based on a value of a parameter which is set in a specific command for the processor of the other type, the value of the parameter which is set in the specific command not affecting execution of processing performed by the processor of the other type.

10 Claims, 2 Drawing Sheets

CONDITIONALLY EXECUTING CONVERTED NON-ISA INSTRUCTIONS BASED ON GPU DISPLAY SETTINGS

CROSS-REFERENCE TO RELATED APPLICATION

The present application claims priority from Japanese application JP 2011-141186 filed on Jun. 24, 2011, the content of which is hereby incorporated by reference into this application.

BACKGROUND OF THE INVENTION

1. Field of the Invention

The present invention relates to an information processing apparatus, an information processing method, a program, and a non-transitory information storage medium.

2. Description of the Related Art

There is known an emulation technology that allows a processor of an apparatus serving as an execution subject of processing (hereinafter, referred to as "processing execution subject apparatus") to execute processing indicated by a command that is executable by a processor of a different type from the processor of the processing execution subject apparatus (hereinafter, referred to as "processor of an other type").

SUMMARY OF THE INVENTION

With expansion in functionalities of processors, the processor of the processing execution subject apparatus may sometimes be allowed to execute control of contents of the processing that cannot be performed by the processor of the other type. Further, there is a case where the processing that is allowed to be executed by the processor of the other type should not be executed by the processor of the processing execution subject apparatus. However, an emulation technology according to the related art does not enable such a setting as to control execution of the processing performed by the processor of the processing execution subject apparatus to be performed without affecting execution of the processing performed by the processor of the other type in order to set a command that is executable by the processor of the other type.

The present invention has been made in view of the above-mentioned problem, and an object of some exemplary embodiments of the invention is to enable such a setting as to control execution of processing performed by a processor of a processing execution subject apparatus to be performed without affecting execution of processing performed by a processor of an other type in order to set a command that is executable by the processor of the other type.

In order to solve the above-mentioned problem, according to an exemplary embodiment of the present invention, there is provided an information processing apparatus, including: an acquisition unit that acquires a command that is executable by a processor of an other type being a processor of a different type from a processor of a processing execution subject apparatus serving as an execution subject of processing; an identification unit that identifies processing that is executable by the processor of the processing execution subject apparatus which is associated with the command acquired by the acquisition unit; and an execution control unit that controls execution of the processing performed by the processor of the processing execution subject apparatus based on a value of a parameter which is set in a specific command for the processor of the other type, the value of the parameter which is set in the specific command not affecting execution of processing performed by the processor of the other type.

According to an exemplary embodiment of the present invention, there is also provided an information processing method, including: acquiring a command that is executable by a processor of an other type being a processor of a different type from a processor of a processing execution subject apparatus serving as an execution subject of processing; identifying processing that is executable by the processor of the processing execution subject apparatus which is associated with the acquired command; and controlling execution of the processing performed by the processor of the processing execution subject apparatus based on a value of a parameter which is set in a specific command for the processor of the other type, the value of the parameter which is set in the specific command not affecting execution of processing performed by the processor of the other type.

According to an exemplary embodiment of the present invention, there is also provided a program stored in a non-transitory computer readable information storage medium, which is to be executed by a computer, the program including instructions to: acquire a command that is executable by a processor of an other type being a processor of a different type from a processor of a processing execution subject apparatus serving as an execution subject of processing; identify processing that is executable by the processor of the processing execution subject apparatus which is associated with the acquired command; and control execution of the processing performed by the processor of the processing execution subject apparatus based on a value of a parameter which is set in a specific command for the processor of the other type, the value of the parameter which is set in the specific command not affecting execution of processing performed by the processor of the other type.

According to an exemplary embodiment of the present invention, there is also provided a non-transitory computer readable information storage medium storing a program which is to be executed by a computer, the program including instructions to: acquire a command that is executable by a processor of an other type being a processor of a different type from a processor of a processing execution subject apparatus serving as an execution subject of processing; identify processing that is executable by the processor of the processing execution subject apparatus which is associated with the acquired command; and control execution of the processing performed by the processor of the processing execution subject apparatus based on a value of a parameter which is set in a specific command for the processor of the other type, the value of the parameter which is set in the specific command not affecting execution of processing performed by the processor of the other type.

According to the exemplary embodiments of the present invention, the execution of the processing performed by the processor of the processing execution subject apparatus is controlled based on the value of a parameter which is set in the specific command for the processor of the other type, the value of the parameter which is set in the specific command not affecting execution of processing performed by the processor of the other type, which enables such a setting as to control the execution of the processing performed by the processor of the processing execution subject apparatus to be performed without affecting the execution of the processing performed by the processor of the other type in order to set a command that is executable by the processor of the other type.

According to the exemplary embodiment of the present invention, the execution control unit performs such control that the value of the parameter which is set in the specific command is used as the value of the parameter for execution of processing indicated by an other command which is performed by the processor of the processing execution subject apparatus.

Further, according to the exemplary embodiment of the present invention, the execution control unit causes the processor of the processing execution subject apparatus to execute the processing associated with the value of the parameter which is set in the specific command.

Further, according to the exemplary embodiment of the present invention, the execution control unit controls the execution of the processing performed by the processor of the processing execution subject apparatus based on the value of the parameter which is set in each of a plurality of the specific commands that are continuous as an instruction string.

Further, according to the exemplary embodiment of the present invention, the acquisition unit sequentially acquires information including the command, and the execution control unit controls the execution of the processing performed by the processor of the processing execution subject apparatus based on the value of the parameter which is set in the specific command, which is acquired after the acquisition unit acquires predetermined information.

Further, according to the exemplary embodiment of the present invention, the execution control unit performs such control as to inhibit the processor of the processing execution subject apparatus from executing processing ranging from processing indicated by a command immediately after the specific command in which the value of the parameter is set as a predetermined start value to processing indicated by a command immediately before the specific command in which the value of the parameter is set as a predetermined end value.

Further, according to the exemplary embodiment of the present invention, the execution control unit controls the execution of the processing performed by the processor of the processing execution subject apparatus based on the value of the parameter which is set in one of a no operation command for the processor of the other type and a command for debugging a program executed by the processor of the other type.

DETAILED DESCRIPTION OF THE INVENTION

Hereinafter, an embodiment of the present invention is described in detail with reference to the accompanying drawings.

Figure 1:
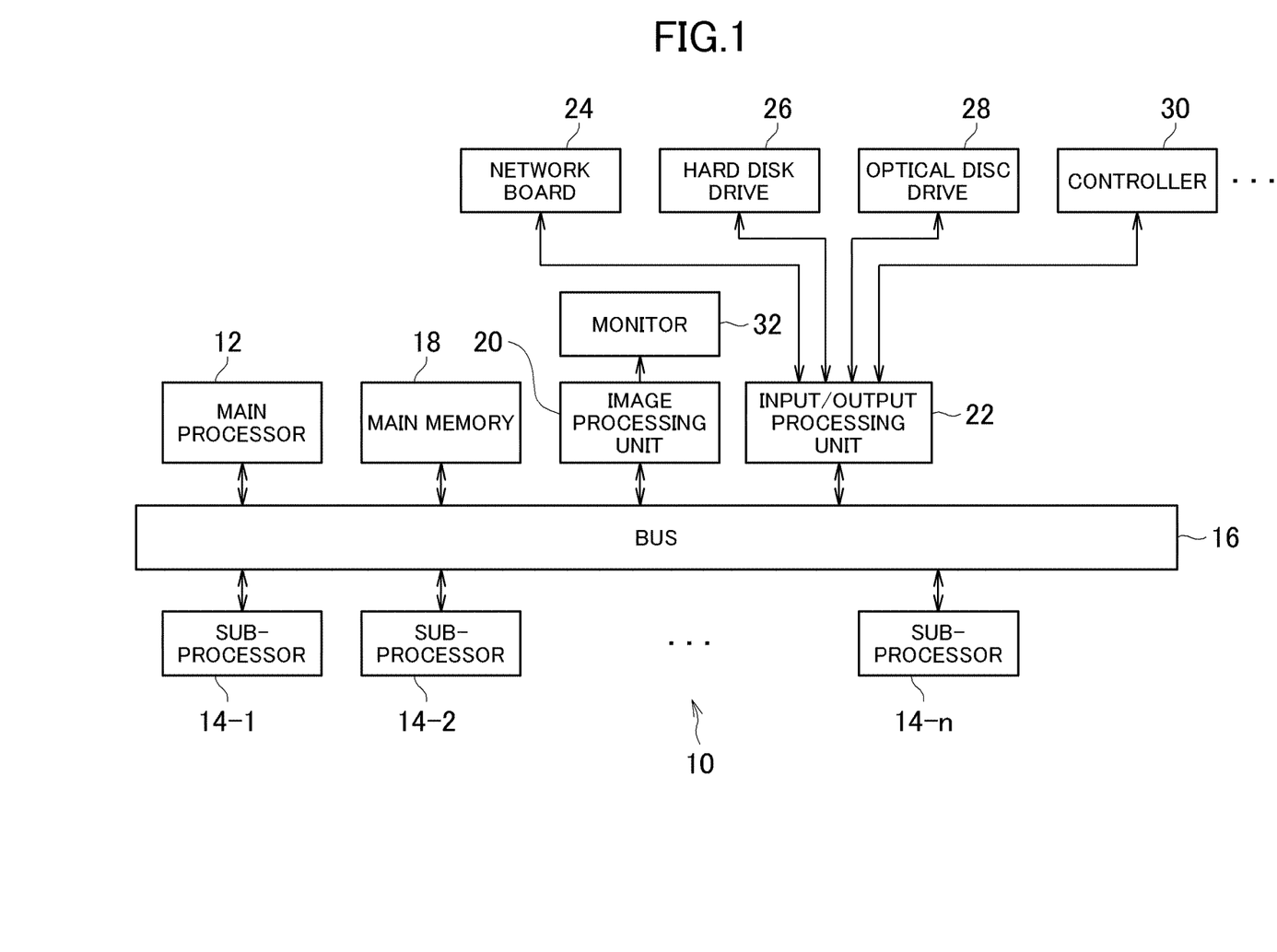
FIG. 1 is a configuration diagram of an information processing apparatus according to an embodiment of the present invention.

FIG. 1 is a configuration diagram of an information processing apparatus 10 according to the embodiment of the present invention. The information processing apparatus 10 according to this embodiment is, for example, a game console. As illustrated in FIG. 1, a control unit of the information processing apparatus 10 according to this embodiment includes a main processor 12 and a plurality of sub-processors 14 (14-1, 14-2, . . . , and 14-n). The main processor 12 and the sub-processor 14 are each connected to a bus 16, and are configured to transmit/receive data to/from each other via the bus 16. The bus 16 is further connected to a main memory 18 and an image processing unit 20, and is also connected to a network board 24, a hard disk drive 26, an optical disc drive 28 for reading an optical disc such as a DVD-ROM or a Blu-ray (registered trademark) disc, a controller 30, and the like via an input/output processing unit 22. Note that, the input/output processing unit 22 may also be connected to other units (for example, a universal serial bus (USB) port, a camera unit, speakers, and a microphone).

The main processor 12 executes a program for a system or the like, and based on a program and data read from an optical disc or a program and data supplied through a communication network, performs various kinds of information processing or performs control on the sub-processor 14. The sub-processor 14 performs the various kinds of information processing in accordance with an instruction from the main processor 12, or controls the respective units of the information processing apparatus 10 based on the program and data read from the optical disc or the program and data supplied through the communication network. Further, in this embodiment, the sub-processor 14 has a direct memory access controller (DMAC) built thereinto, and is configured to directly access the main memory 18 without the intermediation of the main processor 12.

The program and data read from the optical disc drive 28 or the hard disk drive 26 or the program and data supplied through the communication network are written to the main memory 18 as necessary. The main memory 18 is also used as a work memory for the main processor 12 and the sub-processor 14. Further, in this embodiment, the main memory 18 also stores an emulator program to be installed on the information processing apparatus 10 according to this embodiment.

The image processing unit 20 includes a graphical processing unit (GPU) and a frame buffer. The GPU draws an image in the frame buffer based on a graphics command and data supplied from the main processor 12 and the sub-processor 14. The image drawn in the frame buffer is converted into a video signal at a predetermined timing and output to a monitor 32. Note that, for example, a home-use television set or a liquid crystal display is used as the monitor 32.

The monitor 32 according to this embodiment is configured to perform three-dimensional image display (3D display) by a frame sequential method in which an image for a left eye and an image for a right eye are alternately displayed. Then, the information processing apparatus 10 according to this embodiment is previously set as to whether the image is to be output to the monitor 32 by 2D display or by the 3D display. In the case where the 3D display is set, the GPU renders both the image for the left eye and the image for the right eye in their corresponding areas within the frame buffer with regard to each of the input graphics commands.

The input/output processing unit 22 is connected to the network board 24, the hard disk drive 26, the optical disc drive 28, the controller 30, and the like. The input/output processing unit 22 controls data exchange between the main processor 12 and the sub-processor 14, and the network board 24, the hard disk drive 26, the optical disc drive 28, the controller 30, and the like.

The network board 24 is connected to the input/output processing unit 22 and a network, and relays data communication performed by the information processing apparatus 10 to/from an external portion via the network. The optical disc drive 28 reads a program and/or data stored on the optical disc such as a DVD-ROM or a Blu-ray (registered trademark) disc in accordance with instructions from the main processor 12 and the sub-processor 14. Further, the hard disk drive 26 is a general hard disk drive, and reads a program and/or data stored on a hard disk. The optical disc and/or the hard disk have various programs and/or data stored thereon in a computer readable manner. Note that, the information processing apparatus 10 may be configured to be able to read a program and/or data stored on a non-transitory computer readable information storage medium other than the optical disc or the hard disk. The controller 30 is a general-purpose operation input unit, and is used by a user for inputting various operations. The input/output processing unit 22 scans a state of each of the units of the controller 30 every predetermined time (for example, every 1/60th of a second), and supplies an operation state indicating a result thereof to the main processor 12 and/or the sub-processor 14. The main processor 12 and/or the sub-processor 14 determine the content of the operation performed by the user based on the operation state.

An emulator is executed on the information processing apparatus 10 according to this embodiment. The emulator is a process functioning as a virtual machine for executing a program that is executable by an apparatus including a processor of a different type from that of the information processing apparatus 10 (hereinafter, referred to as "apparatus of an other type"). The emulator is generated by activating the emulator program installed on the information processing apparatus 10 according to this embodiment.

The emulator according to this embodiment emulates two types of processor (central processing unit (CPU) and graphical processing unit (GPU)) included in the apparatus of the other type. In the following description, a CPU provided to the apparatus of the other type is referred to as a CPU of an other type, and a GPU provided to the apparatus of the other type is referred to as a GPU of an other type. The main processor 12 and the sub-processor 14 provided to the information processing apparatus 10 according to this embodiment and the CPU of the other type are different in instruction set. Further, the GPU included in the image processing unit 20 provided to the information processing apparatus 10 according to this embodiment and the GPU of the other type are also different in instruction set.

In this embodiment, processing related to the emulation of the CPU of the other type is executed by the main processor 12. Further, in this embodiment, a graphics command (graphics command that is executable by the GPU of the other type) output by the emulated CPU of the other type is written to the main memory 18. Then, the sub-processor 14 converts the graphics command written to the main memory 18 into a graphics command that is executable by the GPU included in the image processing unit 20 of the information processing apparatus 10. Then, the image processing unit 20 executes the converted graphics command.

Figure 2:
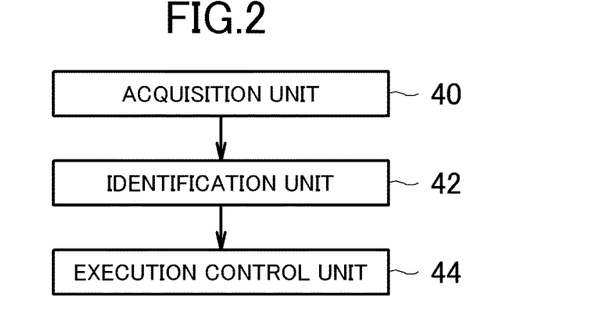
FIG. 2 is a functional block diagram illustrating an example of functions implemented by the information processing apparatus according to the embodiment of the present invention.

FIG. 2 is a functional block diagram illustrating an example of functions related to causing the image processing unit 20 to execute processing corresponding to the graphics command that is executable by the GPU of the other type among functions implemented by the information processing apparatus 10 according to this embodiment. Note that, functions other than the ones illustrated in FIG. 2 are also implemented by the information processing apparatus 10 according to this embodiment. As illustrated in FIG. 2, the information processing apparatus 10 functionally includes an acquisition unit 40, an identification unit 42, and an execution control unit 44 with regard to the above-mentioned functions. Those functions are implemented mainly by the sub-processor 14.

Those functions are implemented by the execution of a program according to this embodiment by the information processing apparatus 10 being an information processing system. The program may be downloaded from another computer through an communication interface via a computer communication network, or may be stored on a non-transitory computer readable information storage medium such as an optical disc (for example, CD-ROM or DVD-ROM) or a USB memory and installed onto the information processing apparatus 10 therefrom through the optical disc drive, the universal serial bus (USB) port, or the like.

The acquisition unit 40 acquires the graphics command output by the CPU of the other type emulated by the emulator. The identification unit 42 identifies processing which is associated with the graphics command acquired by the acquisition unit 40 and which is executable by the GPU included in the image processing unit 20 provided to the information processing apparatus 10 according to this embodiment.

The identification unit 42, for example, references a conversion table obtained by associating the graphics command that is executable by the GPU of the other type with the graphics command that is executable by the GPU included in the image processing unit 20, and converts the graphics command that is executable by the GPU of the other type into the graphics command that is executable by the GPU included in the image processing unit 20. At this time, in a case where a value of a parameter (for example, at least one operand) is set in the graphics command that is executable by the GPU of the other type, the value of the parameter may be converted into the value of the parameter used by the graphics command that is executable by the GPU included in the image processing unit 20. The identification unit 42 may, for example, convert a format of a texture or identify the value of the parameter corresponding to a resolution of an image drawn by the GPU included in the image processing unit 20. In this manner, for example, it is possible to draw the image in the frame buffer by the GPU on the information processing apparatus 10 according to this embodiment with a higher resolution than to draw the image in the frame buffer by the GPU of the other type on the apparatus of the other type. Further, in this embodiment, the texture is cached in the frame buffer included in the image processing unit 20. In a case where one texture is drawn a plurality of times within one frame, the texture cached in the frame buffer included in the image processing unit 20 is reused in the drawing for the second and subsequent times without again locating the texture in the frame buffer.

The execution control unit 44 instructs the image processing unit 20 of the information processing apparatus 10 according to this embodiment to execute the processing identified by the identification unit 42.

Further, in this embodiment, with regard to a specific command (in this case, for example, no operation (NOP) command) for a processor of an other type, the identification unit 42 identifies processing corresponding to the value of the parameter (for example, operand) set in the command. For example, in a case where the value of the parameter set in the NOP command is associated with the command, the identification unit 42 identifies the processing indicated by the command. Further, in a case where the value of the parameter set in the NOP command is associated with the value of the parameter used by an other command, the identification unit 42 determines that the value of the parameter set in the NOP command is set as the value of the parameter used by the other command. Then, in this embodiment, the execution control unit 44 controls an instruction issued to the image processing unit 20 based on the value of the parameter set in the NOP command. For example, in the condition that the processing indicated by the command associated with the value of the parameter set in the specific command is identified by the identification unit 42, the execution control unit 44 instructs the image processing unit 20 to execute the processing. Further, for example, in the condition that the value of the parameter used for the processing which the image processing unit 20 has already been instructed to execute is identified by the identification unit 42, the execution control unit 44 instructs the image processing unit 20 to use the identified value of the parameter in the processing. In this manner, with the emulator according to this embodiment, the value of the parameter set in the specific command is interpreted as a command, the value of a parameter, or the like.

Figure 3:
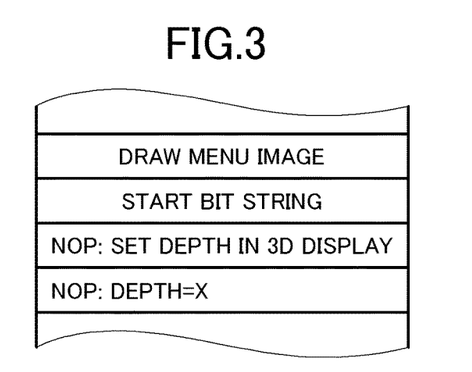
FIG. 3 is a diagram schematically illustrating an example of a series of graphics commands.

FIG. 3 is a diagram schematically illustrating an example of a series of graphics commands acquired by the acquisition unit 40. In this embodiment, a series of processing including processing for acquiring the graphics command by the acquisition unit 40, processing for identifying the corresponding processing by the identification unit 42, and processing for outputting the instruction to the image processing unit 20 by the execution control unit 44 is sequentially performed for each of the graphics commands.

Then, as illustrated in FIG. 3, for example, in a case where after acquiring a drawing command for a menu image, the acquisition unit 40 acquires a specific start bit string indicating to start controlling the processing corresponding to the value of the parameter of the NOP command and then acquires the NOP command in which the value of the parameter is set so as to set a depth with which the menu image is to be located in the 3D display and the NOP command in which the value of the parameter is set so as to set a numerical value indicating the depth with which the menu image is to be located, the identification unit 42 identifies the processing for locating the menu image with the depth indicated by the above-mentioned numerical value in the 3D display, and the execution control unit 44 outputs an execution instruction for the processing to the image processing unit 20. Note that, in this embodiment, the NOP command in which the value of the parameter is set so as to set the depth with which the menu image is to be located in the 3D display and the NOP command in which the value of the parameter is set so as to set the numerical value indicating the depth with which the menu image is to be located are continuous as an instruction string.

In this embodiment, the execution control unit 44 outputs the drawing command for the menu image which is executable by the image processing unit 20 to the image processing unit 20. The GPU included in the image processing unit 20 draws the menu image by the 2D display (draws one image) in the frame buffer if the 2D display is set on the information processing apparatus 10, and if the 3D display is set on the information processing apparatus 10, draws the menu image for the left eye and the menu image for the right eye in the frame buffer so that the menu image is located with the depth indicated by the above-mentioned numerical value.

Of the series of graphics commands exemplified in FIG. 3, no processing is executed for the NOP command in the execution performed by the GPU of the other type. Further, the value of the parameter set in the NOP command is ignored by the GPU of the other type. Therefore, the value of the parameter set in the NOP command does not affect the execution of the processing performed by the GPU of the other type. Meanwhile, with the emulator on the information processing apparatus 10 according to this embodiment, the identification unit 42 identifies the processing or the like corresponding to the value of the parameter for the NOP command. Then, the execution control unit 44 controls the execution of the processing executed by the GPU included in the image processing unit 20 based on the value of the parameter set in the NOP command. The execution control unit 44, for example, outputs the command corresponding to the value of the parameter set in the NOP command to the GPU included in the image processing unit 20, or controls the value of the parameter set in the NOP command to be used as the value of the parameter for the processing executed by the GPU included in the image processing unit 20. Further, in the example of FIG. 3, the information processing apparatus 10 according to this embodiment performs a setting of an extended function (extended processing) that is executable by the image processing unit 20 of the information processing apparatus 10 according to this embodiment (in this case, setting of the depth) in the processing for drawing the menu image also executed by the processor of the other type, based on the value of the parameter set in the NOP command.

In this manner, according to this embodiment, for example, it is possible to set such an extended command as to cause the image processing unit 20 of the information processing apparatus 10 according to this embodiment to execute processing that is not executable by the GPU of the other type, such as displaying of the menu image with a given depth in the 3D display, without affecting the execution of the processing performed by the GPU of the other type. Further, in this embodiment, the processing corresponding to the value of the parameter set in the NOP command acquired by the acquisition unit 40 after the acquisition of the specific start bit string is identified by the identification unit 42, and hence it can be controlled by the start bit string whether or not to perform execution control of the processing using the value of the parameter set in the NOP command. Note that, when the acquisition unit 40 acquires a specific end bit string, with regard to the NOP command to be acquired thereafter, the execution control of the processing using the set value of the parameter may not be performed by the execution control unit 44.

Note that, the description above is made of a method of setting the extended command for the case where the processing which is not executable by the GPU of the other type and which is not executed in the 2D display but is executed in the 3D display is performed on the information processing apparatus 10 according to this embodiment, but in the same manner, the setting of the extended command for the processing which is not executable by the GPU of the other type and which is not executed in the 3D display but is executed in the 2D display can be performed on the information processing apparatus 10 according to this embodiment. For example, post-effect processing (for example, bloom filter processing for blurring an image by adding a predetermined RGB value to pixels that are determined to have a high brightness or blur processing for effecting stronger blurring on pixels exhibiting a larger difference between a given depth of field and a value of a Z-buffer) which is not executable by the GPU of the other type but is executable on the information processing apparatus 10 may not be executed if the 3D display is set but may be executed if the 2D display is set.

For example, in a case where after acquiring the drawing command for the menu image, the acquisition unit 40 acquires the specific start bit string indicating to start controlling the processing corresponding to the value of the parameter of the NOP command and then acquires the NOP command in which the value of the parameter is set so as to execute the bloom filter processing in the 2D display, the identification unit 42 may identify the bloom filter processing, and the execution control unit 44 may output the execution instruction for the processing to the image processing unit 20. The GPU included in the image processing unit 20 may execute the bloom filter processing if the 2D display is set on the information processing apparatus 10, and if the 3D display is set on the information processing apparatus 10, may not execute the bloom filter processing.

In the case where the 3D display is set on the information processing apparatus 10, there is a fear that an image hard for the user to view may be output from the monitor 32 if the above-mentioned post-effect processing is executed after the drawing of the image to be used in the game. However, the information processing apparatus 10 according to this embodiment can prevent the image hard for the user to view from being output from the monitor 32 because the setting of the command related to the above-mentioned post-effect processing as the extended command executed only in the 2D display inhibits the post-effect processing from being executed in the case where the 3D display is set on the information processing apparatus 10.

Further, on the information processing apparatus 10 according to this embodiment, it is possible to set a command to specify a range of the processing which is executed by the GPU of the other type and which is also executed on the information processing apparatus 10 according to this embodiment in the 2D display but is not executed on the information processing apparatus 10 according to this embodiment in the 3D display (hereinafter, referred to as "limit command"). The setting of the limit command is described below.

Figure 4:
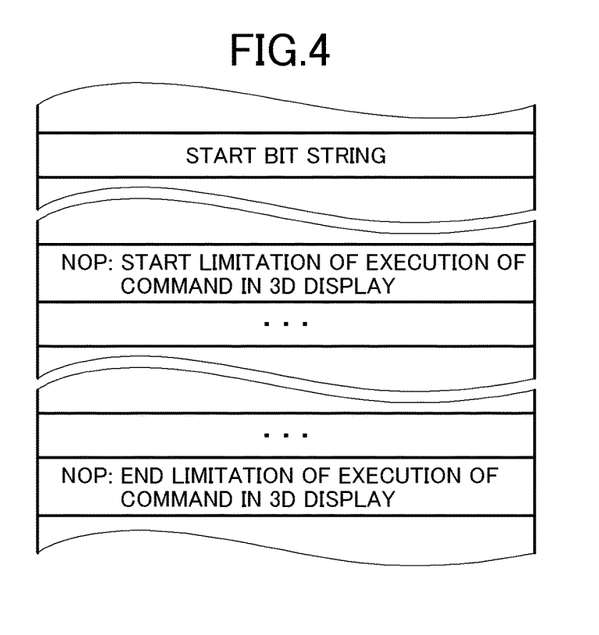
FIG. 4 is a diagram schematically illustrating another example of the series of graphics commands.

FIG. 4 is a diagram schematically illustrating another example of the series of graphics commands acquired by the acquisition unit 40. Those graphics commands are continuous as the instruction string. In the example of FIG. 4, the acquisition unit 40 acquires the specific start bit string indicating to start controlling the processing corresponding to the value of the parameter of the NOP command and then acquires an NOP command in which the value of the parameter is set so as to start limitation of the execution of the command in the 3D display (hereinafter, referred to as "3D execution limitation start command"). After that, the acquisition unit 40 acquires several graphics commands and then acquires an NOP command in which the value of the parameter is set so as to end the limitation of the execution of the command in the 3D display (hereinafter, referred to as "3D execution limitation end command"). In this embodiment, the 3D execution limitation start command and the 3D execution limitation end command correspond to the limit commands. The processing having the range within which the execution is limited by the limit command ranges from the processing indicated by the graphics command immediately after the 3D execution limitation start command to the processing indicated by the graphics command immediately before the 3D execution limitation end command.

Of the series of graphics commands exemplified in FIG. 4, no processing is executed for the NOP command in the execution performed by the GPU of the other type. Further, the value of the parameter set in the NOP command is ignored. Therefore, the processing having the range within which the execution is limited by the limit command is executed by the GPU of the other type.

Meanwhile, with the emulator on the information processing apparatus 10 according to this embodiment, in the case where the 2D display is set on the information processing apparatus 10, control itself is performed as to whether or not to limit the execution of the command in the 3D display based on the 3D execution limitation start command and the 3D execution limitation end command, but the processing having the range within which the execution is limited by the limit command is executed. In the case where the 3D display is set on the information processing apparatus 10, the control is performed as to whether or not to limit the execution of the command based on the 3D execution limitation start command and the 3D execution limitation end command, and the processing having the range within which the execution is limited by the limit command is configured such that the identification of the corresponding processing is performed by the identification unit 42 but the execution instruction for the image processing unit 20 to execute the identified processing by the execution control unit 44 is not performed. In the above-mentioned manner, the setting of the limit command can be performed on the information processing apparatus 10 according to this embodiment.

In this manner, for example, it is possible to inhibit the processing, which is executed by the processor of the other type but should not be executed in the case where the 3D display is set on the information processing apparatus 10, from being executed in the case where the 3D display is set on the information processing apparatus 10, by setting the command regarding the processing between the 3D execution limitation start command and the 3D execution limitation end command.

Further, on the information processing apparatus 10 according to this embodiment, in the same manner, it is possible to set limit commands regarding the processing which is executed by the GPU of the other type and which is also executed on the information processing apparatus 10 according to this embodiment in the 3D display but is not executed on the information processing apparatus 10 according to this embodiment in the 2D display (for example, NOP command set so as to start the limitation of the execution of the command in the 2D display (2D execution limitation start command) and NOP command set so as to end the limitation of the execution of the command in the 2D display (2D execution limitation end command)). Then, it is possible to inhibit the processing, which is executed by the processor of the other type but should not be executed in the case where the 2D display is set on the information processing apparatus 10, from being executed in the case where the 2D display is set on the information processing apparatus 10, by setting the command regarding the processing between the 2D execution limitation start command and the 2D execution limitation end command.

Further, on the information processing apparatus 10 according to this embodiment, in the same manner, it is possible to set limit commands regarding the processing which is executed by the GPU of the other type and which is not executed on the information processing apparatus 10 according to this embodiment in the 3D display or in the 2D display (for example, NOP command set so as to start the limitation of the execution of the command both in the 2D display and in the 3D display (execution limitation start command) and NOP command set so as to end the limitation of the execution of the command both in the 2D display and in the 3D display (execution limitation end command)). Then, it is possible to inhibit the processing, which is executed by the processor of the other type but should not be executed in the case where the 2D display is set or the 3D display is set on the information processing apparatus 10, from being executed on the information processing apparatus 10, by setting the command regarding the processing between the execution limitation start command and the execution limitation end command.

Further, in execution of given processing (for example, filter processing), there is a case where an algorithm suitable for the execution performed by the GPU of the other type (for example, algorithm with low accuracy and light load) and an algorithm suitable for the execution performed on the information processing apparatus 10 according to this embodiment (for example, algorithm with high accuracy and heavy load) may differ. In such a case, for example, the command indicating the processing based on the algorithm suitable for the execution performed by the GPU of the other type may be set between the execution limitation start command and the execution limitation end command, and the NOP command in which the value of the parameter is set so as to execute the processing according to the algorithm suitable for the execution performed on the information processing apparatus 10 according to this embodiment may be set as the command immediately before the execution limitation start command or the command immediately after the execution limitation end command. With such a setting, the processing based on the algorithm suitable for the execution performed by the GPU of the other type is performed on the apparatus of the other type, while the processing based on the algorithm suitable for the execution performed by the image processing unit 20 is performed on the information processing apparatus 10 according to this embodiment.

The description above is made of how the processing corresponding to the graphics command that is executable by the GPU of the other type is executed on the image processing unit 20. On the information processing apparatus 10 according to this embodiment, the processing corresponding to the command that is executable by the CPU of the other type is executed by the main processor 12 by using the same method as described above. A description thereof is described below.

Of the functions implemented by the information processing apparatus 10 according to this embodiment, a functional block diagram illustrating an example of functions related to causing the main processor 12 to execute the processing corresponding to the command that is executable by the CPU of the other type is the same as FIG. 2 except that in this embodiment, those functions are implemented mainly by the main processor 12.

Those functions are implemented by the information processing apparatus 10 being an information processing system executing a program according to this embodiment. The program may be downloaded from another computer through the communication interface via the computer communication network, or may be stored on a non-transitory computer readable information storage medium such as an optical disc (for example, CD-ROM or DVD-ROM) or a USB memory and installed onto the information processing apparatus 10 therefrom through the optical disc drive, the universal serial bus (USB) port, or the like.

The acquisition unit 40 acquires the command which is executable by the CPU of the other type and which is located at an address on the main memory 18 specified by an emulated program counter. The identification unit 42 identifies processing which is associated with the acquired command and which can be executed by the main processor 12. Then, in this embodiment, the main processor 12 executes the processing identified by the identification unit 42. In this embodiment, a series of processing including processing for acquiring the command by the acquisition unit 40, processing for identifying the corresponding processing by the identification unit 42, processing for executing the processing by the main processor 12, and processing for updating the value of the program counter is sequentially performed. With this configuration, the processing corresponding to the series of commands that are executable on the apparatus of the other type is executed by the main processor 12.

In this embodiment, with regard to the specific command (here, for example, a command for debugging at a development phase or no operation (NOP) command, which causes no processing to be executed in an end product; hereinafter, referred to as "specific-command"), the identification unit 42 instructs the execution control unit 44 to perform the control of the processing corresponding to the value of the parameter (for example, operand) set in the specific-command. Then, based on this instruction, the execution control unit 44 controls the execution of the processing performed by the main processor 12. For example, in a case where the acquisition unit 40 acquires the specific-command, the execution control unit 44 causes the main processor 12 to execute the command corresponding to the value of the parameter set in the specific-command, or controls the value of the parameter set in the specific-command so as to be used as the value of the parameter for the processing executed by the main processor 12.

Further, the execution control unit 44 performs such control as to inhibit the main processor 12 from executing the processing ranging from the processing indicated by the command immediately after the specific-command in which the value of the parameter is set so as to start the limitation of the execution of the command to the processing indicated by the command immediately before the specific-command in which the value of the parameter is set so as to end the limitation of the execution of the command.

In this embodiment, the identification unit 42, for example, references a conversion table obtained by associating the command that is executable by the CPU of the other type with the command that is executable by the main processor 12, and converts the command that is executable by the CPU of the other type into the command that is executable by the main processor 12.

No processing is executed for the specific-command in the execution performed by the CPU of the other type. Further, the value of the parameter set in the specific-command is ignored by the CPU of the other type. Therefore, the value of the parameter set in the specific-command does not affect the execution of the processing performed by the CPU of the other type. Meanwhile, with the emulator on the information processing apparatus 10 according to this embodiment, the identification unit 42 identifies the processing or the like corresponding to the value of the parameter for the specific-command. Then, the execution control unit 44 controls the execution of the processing executed by the main processor 12 based on the value of the parameter set in the specific-command.

Further, in this embodiment, a bridge program being a library for converting between a system call of the CPU of the other type and a system call of the information processing apparatus 10 according to this embodiment is loaded in the main memory 18 in advance. In a case where the acquisition unit 40 acquires the command for the system call, the library of the bridge program corresponding to the system call is called with the result that the system call of the information processing apparatus 10 is executed.

Note that, the present invention is not limited to the above-mentioned embodiment.

For example, a method of realizing the 3D display on the monitor 32 is not limited to the frame sequential method. For example, the monitor 32 may be configured to realize the 3D display by a passive glass method of changing a polarization characteristic for each horizontal scan line. Further, the monitor 32 may be naked-eye 3D display that achieves the 3D display by a parallax barrier method.

For example, the information processing apparatus 10 according to this embodiment may be configured to control the execution of the processing performed by the processor mounted to an apparatus outside the information processing apparatus 10. Further, the information processing system according to this embodiment may be structured by a plurality of housings. Further, the above-mentioned specific character strings and the specific character strings within the accompanying drawings are merely examples, which are not limited to those character strings.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing apparatus, comprising:
   an acquisition unit that acquires a set of commands, a first subset of commands of the set being executable by a processor of an other type being a processor of a different type from a processor of a processing execution subject apparatus serving as an execution subject of processing;
   an identification unit that identifies a second subset of commands of the set, the second subset being executable by the processor of the processing execution subject apparatus; and
   an execution control unit that controls execution of the processing performed, as instructed by the second subset of commands, by the processor of the processing execution subject apparatus based on a value of a parameter which is set in a specific command of the first subset of commands for the processor of the other type, wherein
   the value of the parameter which is set in the specific command is ignored by the processor of the other type during execution of processing performed, as instructed by the first subset of commands, by the processor of the other type, wherein
   the specific command is ignored by the processor of the other type during execution of processing performed, as instructed by the first subset of commands, by the processor of the other type, and wherein
   the execution control unit, without referencing a display setting that alternatively indicates two dimensional display or three dimensional display, controls the execution for a two dimensional display based on a determination by the identification unit that the value is associated with a command compatible with a two dimensional display, and controls the execution for a three dimensional display based on a determination by the identification unit that the value is associated with a command compatible with a three dimensional display.

2. The information processing apparatus according to claim 1, wherein the execution control unit performs such control that the value of the parameter which is set in the specific command is used as the value of the parameter for execution of processing indicated by an other command which is performed by the processor of the processing execution subject apparatus.

3. The information processing apparatus according to claim 1, wherein the execution control unit causes the processor of the processing execution subject apparatus to execute the processing associated with the value of the parameter which is set in the specific command.

4. The information processing apparatus according to claim 1, wherein the execution control unit controls the execution of the processing performed by the processor of the processing execution subject apparatus based on the value of the parameter which is set in each of a plurality of the specific commands that are continuous as an instruction string.

5. The information processing apparatus according to claim 1, wherein:
   the acquisition unit sequentially acquires information including the command; and
   the execution control unit controls the execution of the processing performed by the processor of the processing execution subject apparatus based on the value of the parameter which is set in the specific command, which is acquired after the acquisition unit acquires predetermined information.

6. The information processing apparatus according to claim 1, wherein the execution control unit performs such control as to inhibit the processor of the processing execution subject apparatus from executing processing ranging from processing indicated by a command immediately after the specific command in which the value of the parameter is set as a predetermined start value to processing indicated by a command immediately before the specific command in which the value of the parameter is set as a predetermined end value.

7. The information processing apparatus according to claim 1, wherein the execution control unit controls the execution of the processing performed by the processor of the processing execution subject apparatus based on the value of the parameter which is set in one of a no operation command for the processor of the other type and a command for debugging a program executed by the processor of the other type.

8. An information processing method, comprising:
   acquiring a set of commands, a first subset of commands of the set being executable by a processor of an other type being a processor of a different type from a processor of a processing execution subject apparatus serving as an execution subject of processing;
   identifying a second subset of commands of the set, the second subset being executable by the processor of the processing execution subject apparatus; and
   controlling execution of the processing performed, as instructed by the second subset of commands, by the processor of the processing execution subject apparatus based on a value of a parameter which is set in a specific command of the first subset of commands for the processor of the other type, wherein the value of the parameter which is set in the specific command is ignored by the processor of the other type during execution of processing performed, as instructed by the first subset of commands, by the processor of the other type, wherein the specific command is ignored by the processor of the other type during execution of processing performed, as instructed by the first subset of commands, by the processor of the other type, and wherein the execution control unit, without referencing a display setting that alternatively indicates two dimensional display or three dimensional display, controls the execution for a two dimensional display based on a determination by the identification unit that the value is associated with a command compatible with a two dimensional display, and controls the execution for a three dimensional display based on a determination by the identification unit that the value is associated with a command compatible with a three dimensional display.

9. A program stored in a non-transitory computer readable information storage medium, which is to be executed by a computer, the program including instructions to:

acquire a set of commands, a first subset of commands of the set being executable by a processor of an other type being a processor of a different type from a processor of a processing execution subject apparatus serving as an execution subject of processing;

identify a second subset of commands of the set, the second subset being executable by the processor of the processing execution subject apparatus; and control execution of the processing performed, as instructed by the second subset of commands, by the processor of the processing execution subject apparatus based on a value of a parameter which is set in a specific command of the first subset of commands for the processor of the other type, wherein the value of the parameter which is set in the specific command is ignored by the processor of the other type during execution of processing performed, as instructed by the first subset of commands, by the processor of the other type, wherein the specific command is ignored by the processor of the other type during execution of processing performed, as instructed by the first subset of commands, by the processor of the other type, and wherein the execution control unit, without referencing a display setting that alternatively indicates two dimensional display or three dimensional display, controls the execution for a two dimensional display based on a determination by the identification unit that the value is associated with a command compatible with a two dimensional display, and controls the execution for a three dimensional display based on a determination by the identification unit that the value is associated with a command compatible with a three dimensional display.

10. A non-transitory computer readable information storage medium storing a program which is to be executed by a computer, the program including instructions to:

acquire a set of commands, a first subset of commands of the set being executable by a processor of an other type being a processor of a different type from a processor of a processing execution subject apparatus serving as an execution subject of processing;

identify a second subset of commands of the set, the second subset being executable by the processor of the processing execution subject apparatus; and control execution of the processing performed, as instructed by the second subset of commands, by the processor of the processing execution subject apparatus based on a value of a parameter which is set in a specific command of the first subset of commands for the processor of the other type, wherein the value of the parameter which is set in the specific command is ignored by the processor of the other type during execution of processing performed, as instructed by the first subset of commands, by the processor of the other type, wherein the specific command is ignored by the processor of the other type during execution of processing performed, as instructed by the first subset of commands, by the processor of the other type, and wherein the execution control unit, without referencing a display setting that alternatively indicates two dimensional display or three dimensional display, controls the execution for a two dimensional display based on a determination by the identification unit that the value is associated with a command compatible with a two dimensional display, and controls the execution for a three dimensional display based on a determination by the identification unit that the value is associated with a command compatible with a three dimensional display.

* * * * *